(12) United States Patent
Freitas et al.

(10) Patent No.: US 6,954,321 B2
(45) Date of Patent: Oct. 11, 2005

(54) METHOD AND APPARATUS FOR IMPROVED READ-TO-WRITE TRANSITION TIME FOR A MAGNETO-RESISTIVE HEAD

(75) Inventors: David A. Freitas, Morgan Hill, CA (US); Kevin R. Vannorsdel, San Jose, CA (US)

(73) Assignee: Hitachi Global Storage Technologies, Netherlands B.V. (NL)

(*) Notice: Subject to any disclaimer, the term of this patent is extended or adjusted under 35 U.S.C. 154(b) by 530 days.

(21) Appl. No.: 10/080,448

(22) Filed: Feb. 21, 2002

(65) Prior Publication Data

US 2003/0156343 A1 Aug. 21, 2003

(51) Int. Cl.[7] .............................. G11B 5/09; G11B 15/12
(52) U.S. Cl. ........................................... 360/46; 360/62
(58) Field of Search ............................... 360/46, 62, 66, 360/67

(56) References Cited

U.S. PATENT DOCUMENTS

| | | | |
|---|---|---|---|
| 4,868,691 A | | 9/1989 | Kawasaki |
| 5,363,249 A | | 11/1994 | Fitzmorris |
| 5,381,277 A | | 1/1995 | Jaffard et al. |
| 5,434,717 A | * | 7/1995 | Yoshinaga et al. ............ 360/46 |
| 5,623,378 A | | 4/1997 | Shibasaki et al. |
| 5,724,201 A | * | 3/1998 | Jaffard et al. ................ 360/62 |
| 5,793,555 A | | 8/1998 | Belser et al. |
| 6,219,194 B1 | | 4/2001 | Stein et al. |
| 6,621,649 B1 | * | 9/2003 | Jiang et al. .................... 360/67 |

FOREIGN PATENT DOCUMENTS

JP 3-269805 12/1991

* cited by examiner

*Primary Examiner*—David Hudspeth
*Assistant Examiner*—Mitchell Slavitt
(74) *Attorney, Agent, or Firm*—Chambliss, Banner & Stophel; David W. Lynch

(57) ABSTRACT

Magneto-Resistive (MR) head read/write channel (400) provides timer (421), detector (433) and amplifier (432) to reduce the amount of time required to transition from read mode to write mode. Controller (410) issues the write command (WGATE) to signal a pending mode change from read to write mode. While read/write channel (400) remains in read mode, timer (421) begins a configurable countdown sequence, which allows Arm Electronics (430), except for a final output stage of amplifier (432), to power up in preparation for write mode. Once timer (421) has reached terminal count, signal (CHWGATE) is de-asserted, which causes write channel (422) to warm up. After warm up, write channel (422) writes serial data (WRITE DATA) to detector (433). Still in read mode, detector (433) detects the presence of WRITE DATA from write channel (422) and asserts signal (AEWGATE). The assertion of signal (AEWGATE) cancels read mode and enables amplifier (432) to source current to MR head (440) in response to WRITE DATA to begin a fully operational write mode.

25 Claims, 7 Drawing Sheets

METHOD AND APPARATUS FOR IMPROVED READ-TO-WRITE TRANSITION TIME FOR A MAGNETO-RESISTIVE HEAD

BACKGROUND OF THE INVENTION

1. Field of the Invention

This invention relates in general to Magneto-Resistive (MR) head controllers, and more particularly, to MR head controllers that reduce the time required to transition from read mode to write mode.

2. Description of Related Art

Capacities for hard disk drives are increasing faster than ever before. Whether the hard disk application is serving network servers, desktop workstations or notebook systems, hard disk memory capacity is pressed to meet consumer demand. Lower cost per megabyte (MB), in addition to more memory, is also highly desirable. Adding disks and heads, therefore, becomes less desirable, yielding to the push for higher efficiency. Increasing areal densities, or bits of data per square inch of media, becomes the engineering challenge to get higher efficiency.

Magnetic disk drive manufacturers to date have successfully doubled capacities of the magnetic disk drives every 12 to 18 months, by increasing areal density. As areal densities increase, however, smaller recorded patterns result, which yields weaker signals being generated by the read head. Various techniques exist that can compensate for the weaker signals, such as allowing the read head to fly closer to the magnetic medium, or magnetic disk. Other methods such as improved read channel performance or improved read element design are effective to compensate for the weaker read signals, but these techniques are soon reaching the limits of usefulness.

The transition from the inductive head technology used since the inception of the hard disk, to that of Magneto-Resistive (MR) heads has continued the pace of areal density improvements seen today. MR heads can deliver up to four times the areal density possible with conventional thin film inductive heads. The MR technology permits the continued reduction in cost of magnetic storage technology and has several advantages over thin film inductive heads including, separate read and write elements, high signal output, low noise and velocity independent output.

One characteristic of the MR head technology, is that the MR head incorporates separate read and write elements. A thin film inductive element for recording data onto the magnetic media and a magnetically sensitive resistive element for detecting data bits written to the magnetic media. Each of the two elements can be optimized to perform its particular function. The number of wire turns associated with the write element, for example, can be as low as ten, resulting in a low level of write inductance, which increases the data frequency allowed for write operations. In addition, the read element of the MR head can be made narrower than the written track, such that some misalignment between the read head and the track can be tolerated.

The write element of an MR head generally consists of two magnetic pole pieces that are typically made of a soft magnetic material, such as permalloy. The pole pieces are connected at the ends that point away from the disk surface. Coiled through the middle of the pole pieces is a deposited copper wire. When a current is conducted through the coil, it produces a magnetic field that jumps across the gap between the two inner ends of the pole pieces at the surface of the head. The magnetic fringe field associated with the gap is used to write data onto a magnetic medium by reversing the direction of the magnetic fields on the magnetic medium's surface. During a write operation, a pre-amplifier is used to generate the current pulse conducted by the coil, which is generally on the order of 40–100 milliamps (mA).

The MR head's separate read element consists of a stripe of permalloy material, or MR stripe, placed next to one of the write element's magnetic pole pieces. The electrical resistance of the MR stripe changes by a few percent when it is placed in the vicinity of a magnetic field. The change in electrical resistance of the MR stripe allows the MR head to detect magnetic flux transitions associated with recorded bit patterns. During a read operation, the read pre-amplifier generates a small bias current through the MR stripe, which sets up a bias potential across the MR stripe. As the MR stripe is exposed to the magnetic field from the magnetic medium, the resistance of the MR stripe changes and a voltage change is measured across the MR stripe as a result of the resistance change caused by the magnetic field. A read signal is then generated, which is proportional to the change in bias potential caused by the magnetic field.

As the MR head flies over the magnetic medium, various read and write operations are performed on the magnetic medium. A hard disk application within a computer system, for example, uses sectors within the hard disk to store data for future access. Circuitry controlling the MR head, causes the MR head to alternate between write and read operations, according to whether the MR head is storing data to the hard disk or retrieving data from the hard disk, respectively. The read and write operations generally toggling at the boundaries to the sectors.

Since the MR head contains separate read and write elements, separate read and write data channels along with the associated control are required as well. In read mode, for example, a read channel preamplifier is situated between the MR read element and the read channel so as to amplify the detected magnetic data prior to transmission to the read data channel. Likewise, an amplifier circuit is used in write mode, such that the write amplifier is fixed between the write data channel and the MR head's write element. The write amplifier is required to supply a relatively large amount of current to the write element of the MR head and generally requires a finite amount of time to stabilize, i.e.—an amount of time required before the current supplied by the write amplifier is considered to be reliable.

A problem exists, which is inherent with current generation write electronics, such that the transition between the two modes of operation of the MR head causes unstable current behavior in the write element of the MR head, especially when the MR head transitions from a read to a write operation. A warm up time, or stabilization period, is required before the write channel amplifier can be used for write operations. During the stabilization period, inaccurate and uncontrolled currents may be flowing through the write coil of the MR head, which in turn may cause damage or erasure of pre-existing data to that portion of the hard disk that the MR write head is positioned over. To avoid damage to data that may be stored on the magnetic disk, blank areas on the magnetic disk must be predefined to account for the stabilization period required for the transition between read and write operations. Blank areas, however, subtract from the usable area on the hard disk, which decreases the storage capacity of the hard disk. A direct correlation between reduced storage capacity and write channel stabilization results, whereby any decrease in the stabilization time required prior to the write operation results in a reduced blank area requirement for the hard disk and thus, increases the storage capacity of the hard disk.

A need exists, therefore, for a method and apparatus that is effective to reduce the stabilization time required prior to the write operation of the MR head. A reduction in the stabilization time required would directly result in an effective increase in the areal density of the hard disk and would support the current effort to improve areal densities of magnetic media.

SUMMARY OF THE INVENTION

To overcome the limitations in the prior art described above, and to overcome other limitations that will become apparent upon reading and understanding the present specification, the present invention discloses a method and apparatus to reduce the amount of time required to transition between read and write modes of an MR head read/write controller. In particular, the read mode of operation is allowed to continue while all but the final write amplifier stage warms-up or stabilizes. Once stabilized, valid write data is detected, which ends read mode and starts a valid write mode. The present invention thus allows a reduction in the amount of guard time required between read and write mode conversion, which yields an improved areal density.

In accordance with the principles of the present invention, a computer system having a hard disk employs a write channel. The write channel allows a reduction in the amount of time required to transition between read and write modes. The write channel comprises a controller that provides a control signal and a data signal. A data channel is provided to receive the control and data signals and to start a timer upon receipt of the control signal. The data channel provides a write signal upon expiration of the timer. The write channel further comprises a write amplifier that detects the write signal and provides a flux inducing signal in response to the write signal upon detection of the write signal.

Other aspects of the write channel are such that the control signal starts a warm-up period for the data channel and write amplifier and ends when the write signal is provided.

Another aspect of the write channel includes a detector to receive the write signal and asserts an enable signal upon detection of the write signal, where a final write stage receives the write signal and provides the flux inducing signal after assertion of the enable signal.

In another embodiment of the present invention, a write channel of a magnetic head controller provides a data channel that receives write data and a control signal and starts a timer upon receipt of the control signal. The data channel transmitting the write data upon expiration of the timer. The magnetic write channel further comprises a detector to detect the write data and provide a write control signal after detecting the write data. An amplifier is provided to receive the write control signal and the write data and converts the write data into a magnetic head signal in response to the write control signal.

Another aspect of the write channel includes a logic circuit to receive the write data and provide a detection signal upon detection of a transition of the write data and a memory storage device to receive the detection signal and provide the write control signal.

In another embodiment of the present invention, a write channel of a magnetic head controller includes a data channel means to receive write data and a control signal and starts a timer upon receipt of the control signal. The data channel means transmits the write data upon expiration of the timer. The magnetic head controller further comprises a detector means to detect the write data and provide a write control signal after detecting the write data. The magnetic write channel further comprising an amplifier means to receive the write control signal and the write data and to convert the write data into a magnetic head signal in response to the write control signal.

Another aspect of the detector means includes a logic circuit to receive the write data and provide a detection signal upon detection of a transition of the write data and further includes a memory storage device to receive the detection signal and provide the write control signal.

In accordance with the principles of the present invention a method of operating a write channel of a magnetic head controller establishes a write stabilization period while remaining in a read mode of operation, transmits write data when the stabilization period expires, detects the write data to cancel the read mode of operation, and converts the write data to a magnetic head flux signal in response to detecting the transmitted write data.

In another embodiment of the present invention, an article of manufacture comprises a program storage medium readable by a computer to embody one or more programs of instructions executable by the computer to perform a method of operating a write channel of a magnetic head controller. The method comprises the steps of establishing a write stabilization period while remaining in a read mode of operation, transmitting write data when the stabilization period expires, detecting the write data to cancel the read mode of operation, and converting the write data to a magnetic head flux signal in response to detecting the transmitted write data.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method to reduce the amount of transition time required to transition from a read mode to a write mode of operation for an MR head. Sufficient time is allocated in the present invention so that a majority of the write channel is allowed to stabilize, while the read channel is allowed to operate. A final write drive stage of a write channel preamplifier is held off such that no current flows through the write element of the MR head prior to stabilization of the write channel. Once write data is detected, read mode is canceled and the fully operational write mode takes over, yielding a significant decrease in the amount of time required to transition from read to write modes.

Figure 1:
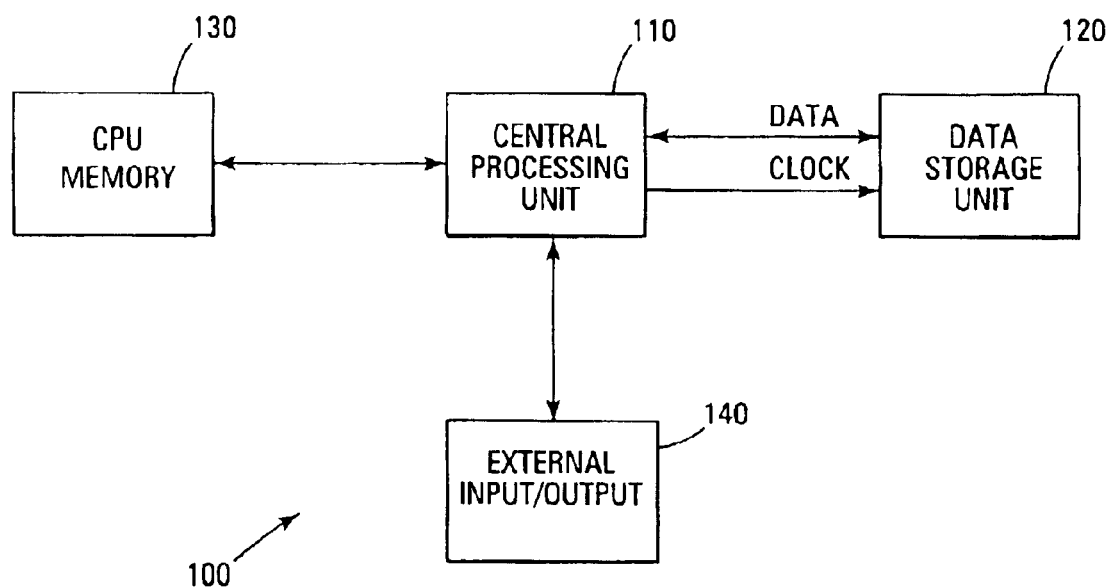
FIG. 1 illustrates a block diagram of a data storage unit application.

FIG. 1 illustrates a block diagram of an exemplary computing application 100. Central Processing Unit (CPU) 110 performs read and write operations on Data Storage Unit (DSU) 120 via the DATA and CLOCK signal lines connecting CPU 110 with DSU 120. DSU 120 may be implemented with a number of storage technologies such as a tape drive or hard disk drive, where each technology implements MR head operation. DSU 120 may also be implemented in an array configuration, such that DSU 120 represents many hard disk or tape drives connected in parallel for expanded memory or fault tolerant applications. DSU 120 may also represent a large capacity Direct Access Storage Device (DASD) employing multiple hard disk media and MR heads. CPU memory 130 represents Random Access Memory (RAM) and Cache memory as required by CPU 110 to conduct computing operations as required. External Input/Output (I/O) 140 is representative of I/O devices found in many computing applications such as a monitor, keyboard, mouse, Compact Disc (CD), etc.

Figure 2:
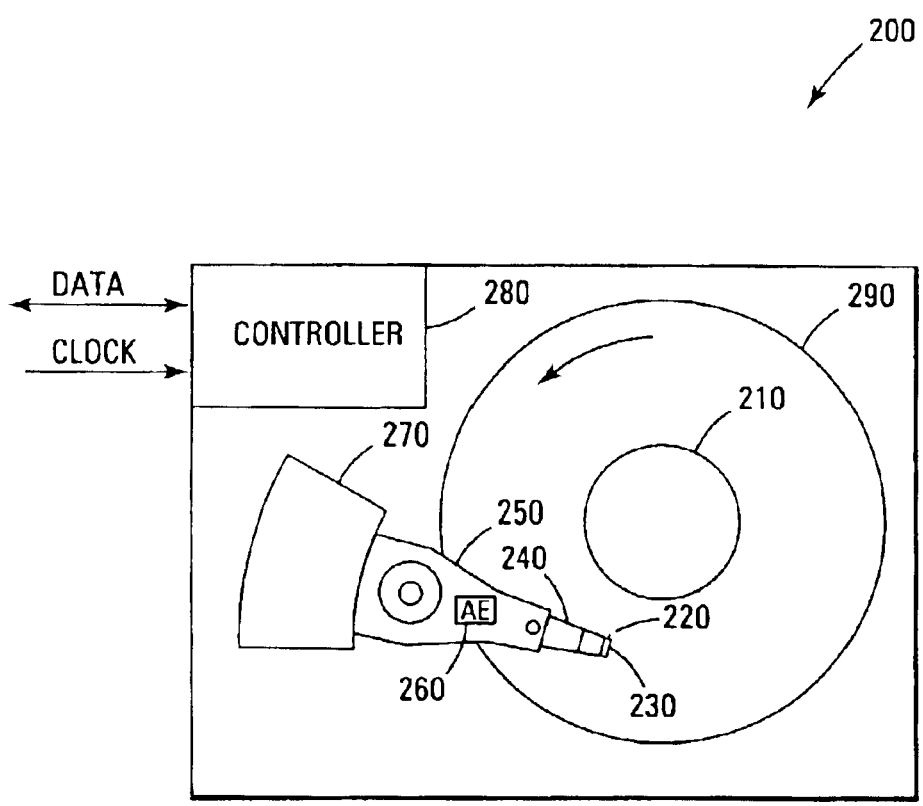
FIG. 2 illustrates typical components of a hard disk.

FIG. 2 illustrates an exemplary magnetic disk drive 200. DATA and CLOCK signals are received by controller 280 from, for example, CPU 110. Disk drive 200 includes a spindle 210 that supports and rotates a magnetic disk 290. Spindle 210 is rotated by a spindle motor (not shown), such that the magnetic disk 290 rotates in the direction shown by the arrow, the spindle motor control electronics being encapsulated within controller 280. Slider 220 supports a combined read and write MR head 230 and is supported by suspension 240 and actuator arm 250 that is rotatably positioned by actuator 270. The suspension 240 and actuator arm 250 are moved by actuator 270 to position slider 220 so that MR head 230 is in a transducing relationship with a surface of magnetic disk 290. When magnetic disk 290 is rotated by spindle 210, slider 220 is supported on a thin cushion of air, wherein the transducing portion of MR head 230 presents an Air Bearing Surface (ABS) to the surface of magnetic disk 290. MR head 230 may then be employed to write information onto magnetic disk 290, or read information from magnetic disk 290, according to the configuration of MR head 230, as controlled by Arm Electronics (AE) 260. AE 260 provides a direct interface to MR head 230 during read and write operations with magnetic disk 290. AE 260 is generally mounted to actuator arm 250, receiving control input from controller 280 as well as read and write data from read and write data channels (not shown).

Figure 3:
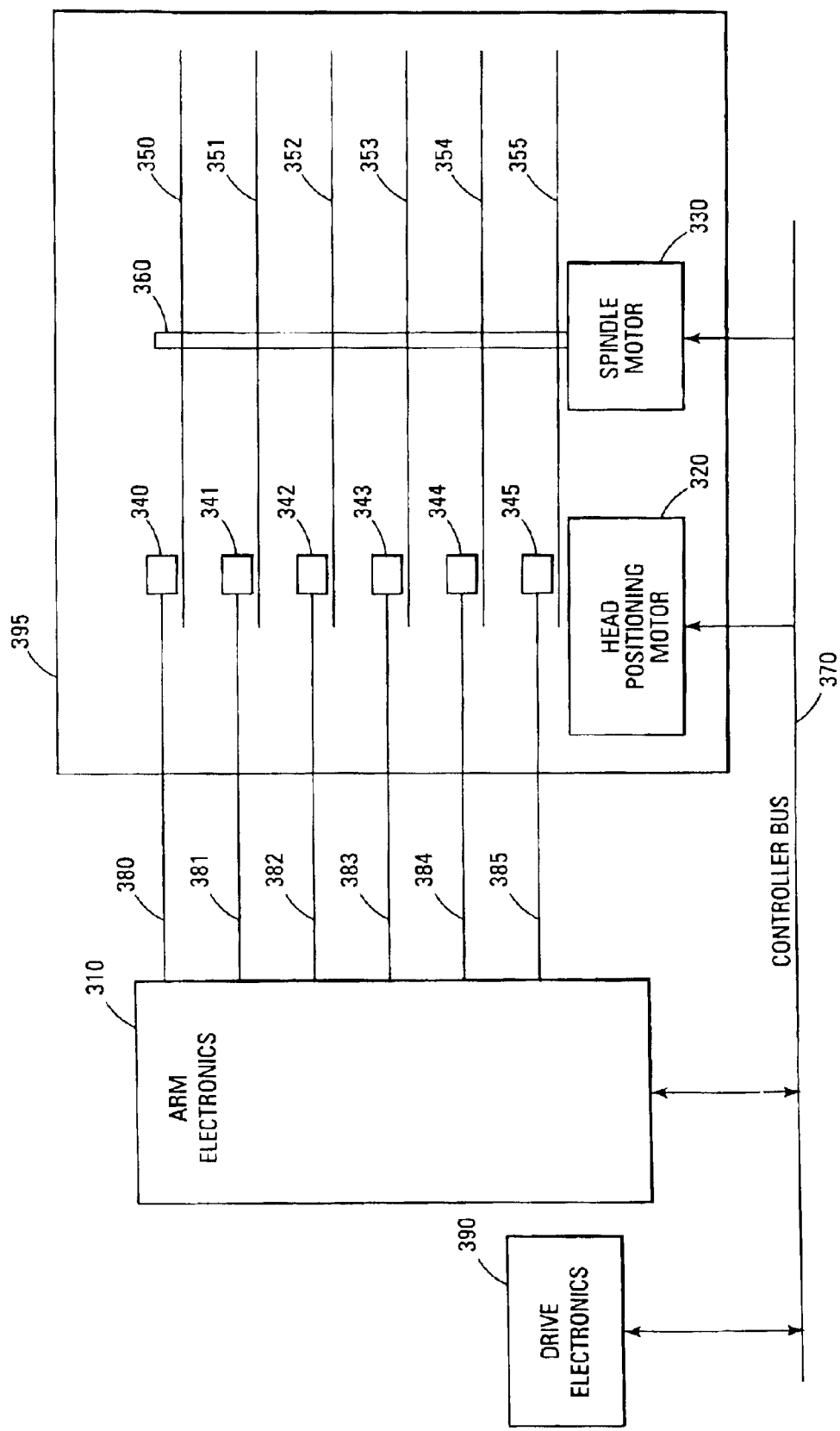
FIG. 3 illustrates a block diagram of a Direct Access Storage Device (DASD)

FIG. 3 illustrates a block diagram representation of DASD 300 with associated arm electronics 310, drive electronics 390 and head and disk assembly 395, which may be employed as DSU 120 illustrated in FIG. 1. Head and disk assembly 395 provides multiple magnetic disks 350–355 mounted to spindle 360. Spindle motor 330 is operative to rotate magnetic disks 350–355 according to control inputs received from a positioning control unit (not shown) contained within drive electronics 390 on controller bus 370. Head positioning motor 320 also receives positioning control inputs from the positioning control unit contained within drive electronics 390 on controller bus 370. MR heads 340–345 receive analog control signals via AE signal lines 380–385 in order to control the magnetic state of MR heads 340–345.

In operation, head and disk assembly 395 receives spindle motor control inputs from controller bus 370 to rotate magnetic disks 350–355 at an acceptable rate, such that a reasonable transducing relationship is obtained between MR heads 340–345 and magnetic disks 350–355. Head positioning motor 320 receives control inputs from controller bus 370, such that MR heads 340–345 are adequately positioned in relation to data tracks existing on magnetic disks 350–355. Magnetic disks 350–355 are formatted into sectors, which are separated by guard zones between each sector. The guard zones being effective to provide a stabilization period, as discussed above, to allow for a read to write mode transition without harming pre-existing data stored on the magnetic disks 350–355. Multiple data tracks exist within each sector, such that each data track is radially offset from the center of each magnetic disk. As the magnetic disks spin about their center, MR heads 340–345 are positioned within the center of each data track of each magnetic disk, so that multiple data tracks of multiple sectors can be traversed during read and write operations to the multiple data tracks. The MR heads are said to fly over the data tracks as the magnetic disks spin beneath them.

The read and write operations of the MR heads 340–345 are synchronized with sector boundaries for each data track of magnetic disks 350–355, respectively. The beginning and ending of each sector is traversed by each MR head in a fixed amount of time, which is directly proportional to the angular velocity of the magnetic disk. Likewise, each guard zone of each sector is traversed in a fixed amount of time. The amount of time required to traverse each guard zone being directly proportional to an amount of time required to transition DASD 300 from read mode to write mode. That is to say, every component of DASD 300, requires a finite amount of time in which to stabilize between operational mode transitions. Read operations, for example, require the read data channel preamplifier circuitry (not shown) to drive a low level current through the MR head so as to enable a detection of data on the magnetic disk using the magneto-resistive properties of the MR head as discussed above. Conversely, a significantly larger amount of current is required of the write data channel preamplifier (not shown) during write operations, to produce a sufficient magnetic fringe field to cause a reversal of the magnetic fields on the surface of the magnetic disk. The write mode of operation generally involves high powered circuitry with prolonged stabilization periods. Accordingly, a finite amount of time, or guard time, is required for DASD 300 to toggle between read and write configuration modes, the finite amount of time being accounted for by the guard zones between each sector.

Figure 4:
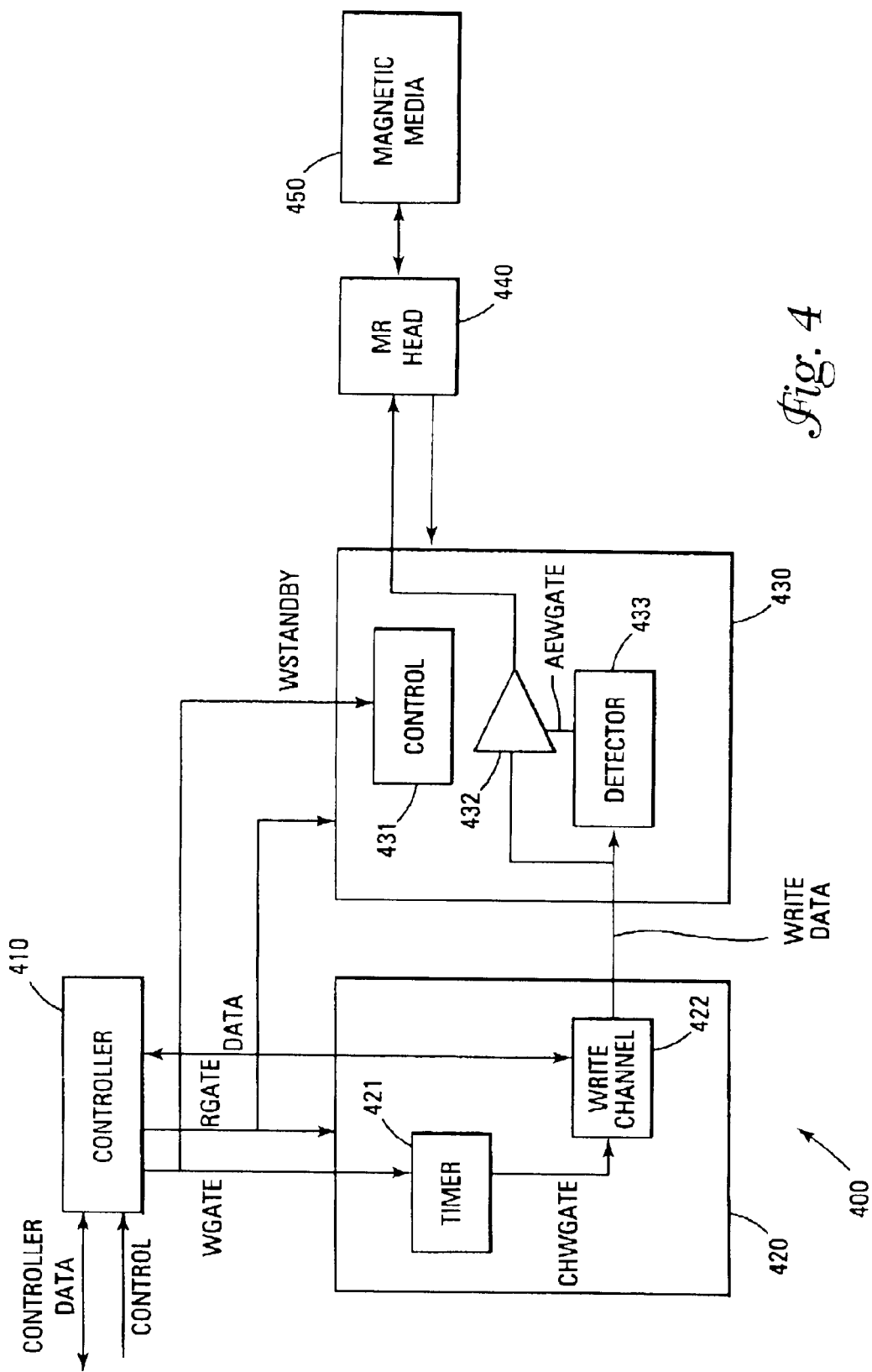
FIG. 4 illustrates a block diagram of a read/write channel in accordance with one embodiment of the invention.

FIG. 4 illustrates a block diagram of read/write channel 400, in accordance with one embodiment of the invention, such that the guard time is minimized through the operation of timer 421, detector 433, and amplifier 432. Controller 410 is coupled to, for example, CPU 110, via data bus CON- TROLLER DATA. All data written to and read from magnetic media 450 is transported by data bus CONTROLLER DATA. Controller 410 receives control input from, for example, CPU 110 via control bus CONTROL. Controller 410, in response to data and control input from CONTROLLER DATA and CONTROL buses, respectively, provides associated data and control to data channel 420 and AE 430. Read channel circuitry within data channel 420 and AE 430 is not shown so that the explanation of the write mode of operation of read/write channel 400 can be simplified.

Figure 5:
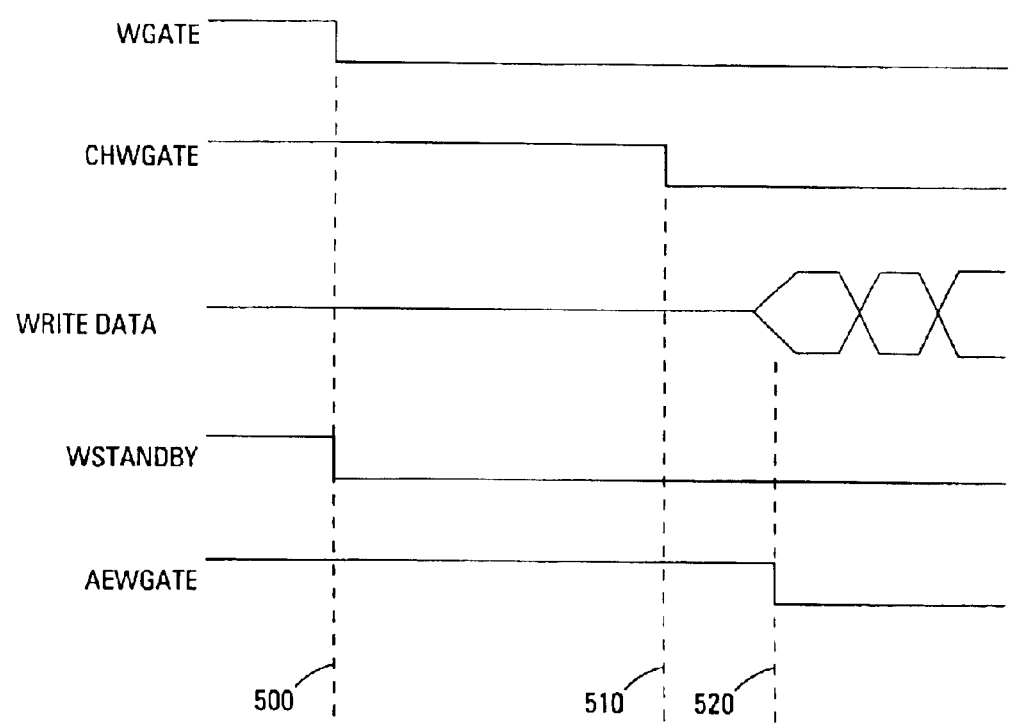
FIG. 5 illustrates a timing diagram useful in explaining the operation of the read/write channel of FIG. 4.

The mode of operation during a data read to a data write mode of operation sequence is facilitated using the timing diagram of FIG. 5 in conjunction with the block diagram of FIG. 4. During a read mode of operation, controller 410 receives parallel data, to be written to magnetic media 450, from data bus CONTROLLER DATA. Controller 410 buffers the parallel data and asserts signal WGATE at time 500 to signify the beginning of the data write sequence, while maintaining the current read mode of operation. Timer 421 begins a configurable countdown sequence at time 500, in order to allow sufficient warm up time for AE 430. Control 431 of AE 430 detects the pending data write mode through the assertion of signal WSTANDBY at time 500 and begins to stabilize all but the final output stage of amplifier 432 for a subsequent write sequence to MR head 440. While all but the final output stage of amplifier 432 is stabilizing, timer 421 continues to countdown the configurable countdown sequence. Once timer 421 expires at time 510, signal CHWGATE is asserted to write channel 422, signifying that AE 430 has had time to stabilize. Write channel 422 begins a warm-up process beginning at time 510. At time 520, write channel 422 is stabilized and begins accepting parallel data from controller 410. Write channel 422 serializes the parallel data received from data bus DATA into logic data stream WRITE DATA. Logic data stream WRITE DATA from write channel 422 is, for example, characterized by a Positive Emitter Coupled Logic (PECL) signal.

Once WRITE DATA becomes active at time 520, detector 433 detects the data activity and asserts signal AEWGATE signifying the end of the read mode and that WRITE DATA is ready to be applied to MR head 440. AE 430 converts WRITE DATA from a PECL signal to a current signal, which is subsequently applied to a write coil (not shown) contained within MR head 440. The current conducted through the write coil of MR head 440 is effective to create a magnetic field, whose magnitude is sufficient to reverse the magnetic field lines of magnetic media 450, thereby storing the WRITE DATA signal to a data track of a sector of magnetic media 450. The aforementioned operation of read/write channel 400 is referred to as Activation by Channel, or ABC-Write.

It can be seen, therefore, that detector 433 is operative to enable amplifier 432 only after AE 430 has had sufficient time to stabilize and not until valid write data is available from write channel 422. The amount of guard time that is predetermined for magnetic media 450 is reduced, since AE 430 is only allowed to produce write current through MR head 440 when valid data is available, or when ABC-Write mode is active. That is to say, during a data write mode, amplifier 432 is only activated when valid data is driving the input to amplifier 432. The occurrence of inaccurate and uncontrolled current from amplifier 432 is, therefore, substantially eliminated, which in turn, allows the guard time between sectors to be reduced accordingly. Reducing the guard time between sectors of a magnetic medium directly affects storage capacity, since the amount of storage capacity gained is directly proportional to the amount of guard time reduced.

Figure 6:
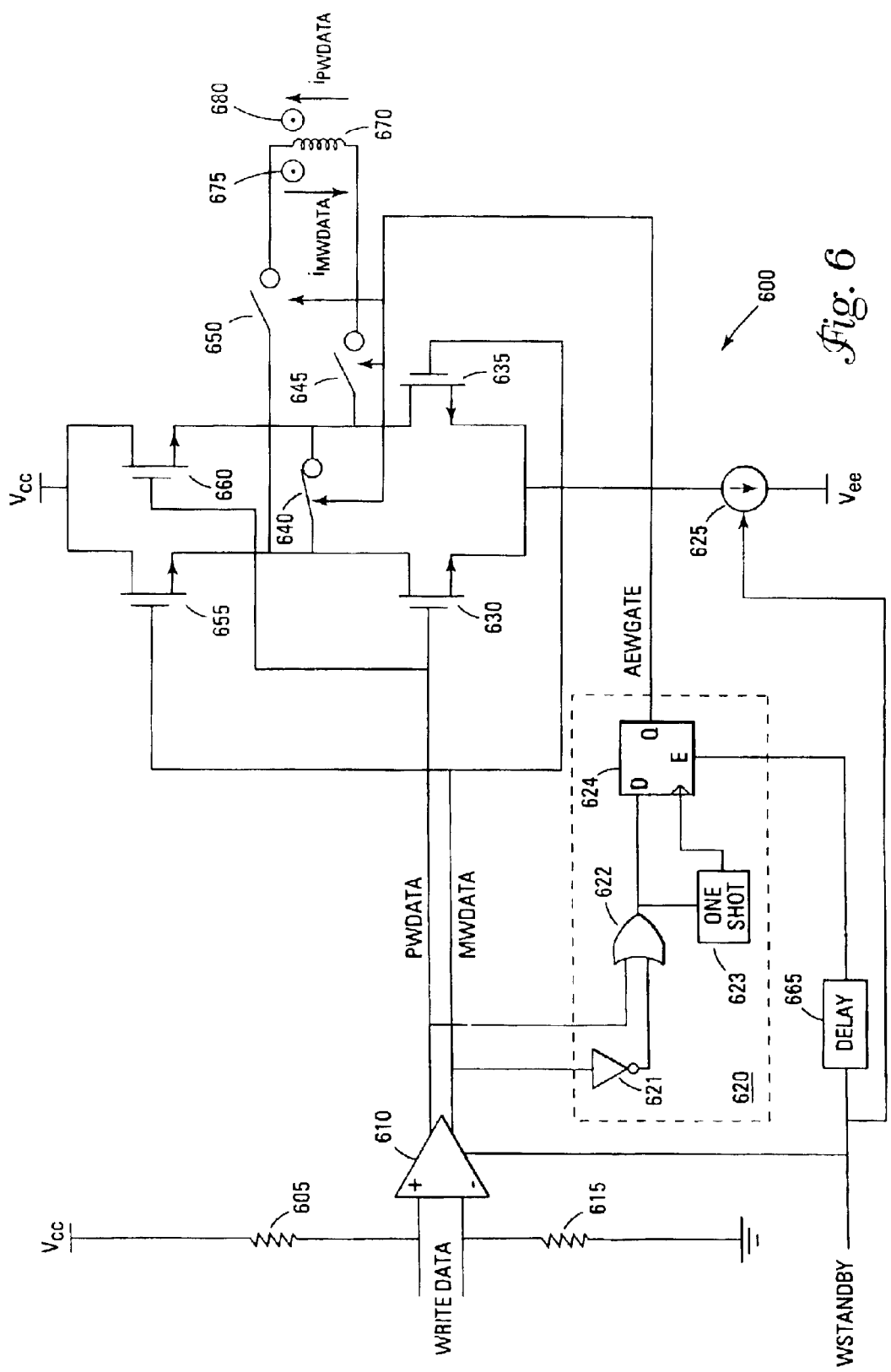
FIG. 6 illustrates a schematic diagram of a write amplifier.

FIG. 6 illustrates an exemplary schematic diagram of write amplifier 600 of the write portion of AE 430 in accordance with one embodiment of the invention. WRITE DATA is illustrated to be differential data received at amplifier 610 from write channel 422. First terminals of resistors 605 and 615 are coupled to the non-inverting and inverting inputs, respectively, of amplifier 610. Second terminals of resistors 605 and 615 are coupled to supply potentials $V_{cc}$ and, for example, ground potential, respectively. Signal WSTANDBY is coupled to delay 665, current source 625 and amplifier 610. Delay 665 provides a delayed WSTANDBY signal to transition detect 620. Transition detect 620 receives differential signals PWDATA and MWDATA at the first input to OR gate 622 and the input to INVERTER 621, respectively. The output of INVERTER 621 is coupled to the second input of OR gate 622. The output of OR gate 622 is coupled to the D input of D flip-flop 624 and to the input of ONE SHOT 623. The output of ONE SHOT 623 is coupled to the clock input of D flip-flop 624. The delayed WSTANDBY signal is coupled to the enable input of D flip-flop 624. The Q output of D flip-flop 624 provides signal AEWGATE. PWDATA is coupled to the gate terminal of N-type Field Effect Transistor (NFET) 630 and NFET 660 and MWDATA is coupled to the gate terminal of NFET 635 and NFET 655. The source terminals of NFETs 630 and 635 are coupled together at a first terminal of current source 625. A second terminal of current source is coupled to supply terminal $V_{ee}$. Signal AEWGATE is coupled to the control terminals of switches 640, 645 and 650. The drain terminals of NFETs 630 and 635 are coupled to the source terminals of NFETs 655 and 660, respectively. Switch 640 is coupled between drain terminals of NFETs 630 and 635. First terminals of switches 645 and 650 are coupled to the drain terminals of transistors 635 and 630, respectively. Second terminals of switches 645 and 650 are coupled to inductive element 670. The drain terminals of NFETs 655 and 660 are coupled to supply potential $V_{cc}$. It should be noted that NFETs 630, 635, 655 and 660 are denoted as N-type field effect transistors, however, may be implemented with NPN bipolar transistors, P-type FETs, PNP bipolar transistors or any other device whose conductive state is controlled with a control signal, as required.

In operation, amplifier 610 receives differential signal WRITE DATA from write channel 422 once timer 421 reaches its terminal count and asserts signal CHWGATE. The output terminals of write channel 422, however, are tri-stated prior to the assertion of signal CHWGATE, such that a very high impedance is presented to the differential input of amplifier 610. Pull up and pull down resistors 605 and 615 are utilized to present a logic high value for signal PWDATA and a logic low value for signal MWDATA to the input of amplifier 610 prior to the assertion of signal CHWGATE. Once signal WGATE (WSTANDBY) is asserted by controller 410, amplifier 610 is rendered active with valid output data, PWDATA and MWDATA, since resistors 605 and 615 provide a known differential signal to the input of amplifier 610. Delay 665 is configurable to an amount of delay substantially equal to the terminal count value of timer 421, such that transition detect 620 and current source 625 are enabled with a delayed WSTANDBY signal, substantially in synchronization with signal CHWGATE at time 510 as illustrated in FIG. 5. Transition detect 620 and current source 625 having an amount of time equal to the time between time 510 and time 520 of FIG. 5 to establish a stable operational state. At a time prior to time 520, signal AEWGATE is un-asserted, which is effective to open circuit the first and second terminals of switches 645 and 650, and short circuit the first and second terminals of switch 640, so that transistor pair 660 and 630 are conductive, in response to the logic values of PWDATA and MWDATA as provided by resistors 605 and 615.

Once timer 421 expires, write channel 422 may transmit a preamble bit or a stream of bits, such that a data transition is guaranteed at signals PWDATA and MWDATA, causing the output of OR gate 622 to transition to a logic low value. The logic low value is presented to D flip-flop 624 and the logic high to logic low transition causes ONE SHOT 623 to provide a single clock pulse to D flip-flop 624. The Q output of D flip-flop 624 latches the logic low value to assert signal AEWGATE. It should be noted that transition detect circuit 620 may be comprised of any combination of logic gates, as known by someone of ordinary skill in the art, such that a known data transition at signals PWDATA and MWDATA produces an assertion of signal AEWGATE. Once signal AEWGATE is asserted, first and second terminals of switches 645 and 650 are shorted together and first and second terminals of switch 640 are open circuited to allow current to be conducted by inductive write element 670. The direction of current conducted by inductive write element 670 is dependent upon the logic value of PWDATA and MWDATA.

A logic high value for PWDATA renders transistor 630 and transistor 660 conductive. The complementary signal, MWDATA, is at a logic low level, which renders transistors 635 and 655 non-conductive. Current $i_{PWDATA}$ is conducted through transistor 660, switch 645, inductive element 670, switch 650 and transistor 630, having a magnitude equal to the amount of current conducted by current source 625. It can be seen that current $i_{PWDATA}$ induces magnetic flux lines in a direction orthogonal to the current flow according to symbol 675. Conversely, a logic low value for PWDATA renders transistor 630 and transistor 660 non-conductive. The complementary signal, MWDATA, is at a logic high level, which renders transistors 635 and 655 conductive. Current $i_{MWDATA}$ is conducted through transistor 655, switch 650, inductive element 670, switch 645 and transistor 635, having a magnitude equal to the amount of current conducted by current source 625. It can be seen that current $i_{MWDATA}$ induces magnetic flux lines in a direction orthogonal to the current flow according to symbol 680. The magnetic flux lines being effective to write data onto a magnetic medium as discussed above.

Figure 7:
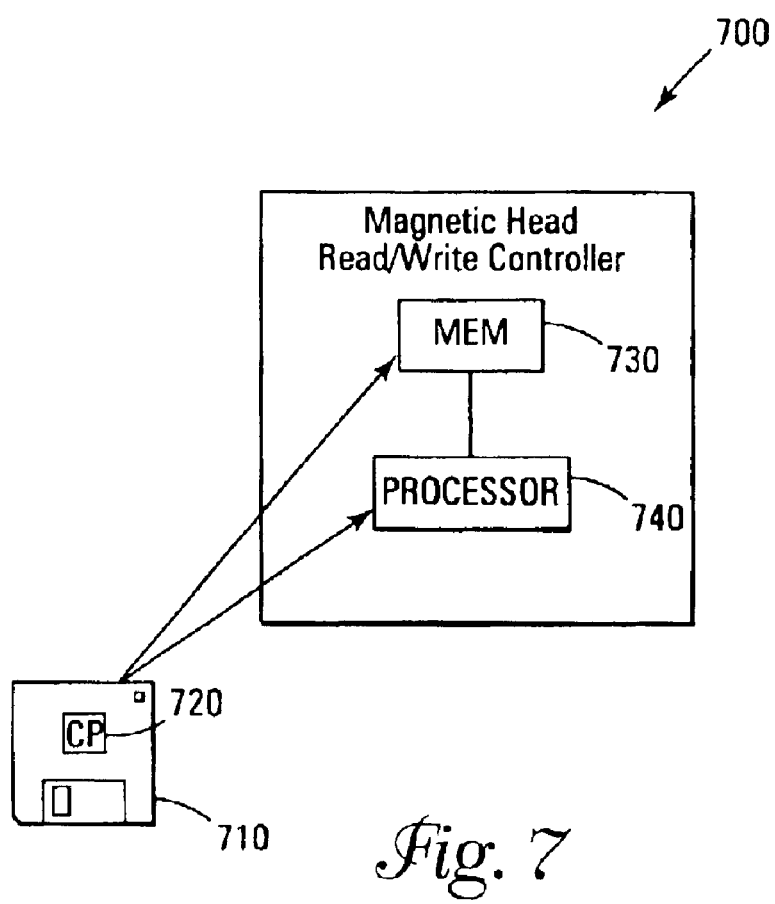
FIG. 7 illustrates a read/write channel configurable by a computer via a program located on removable media that is readable by the computer.

FIG. 7 illustrates magnetic read/write head controller 700 according to the present invention, wherein the process illustrated with reference to FIGS. 1–6 may be tangibly embodied in a computer-readable medium or carrier, e.g. one or more of the fixed and/or removable data storage devices 710 illustrated in FIG. 7, or other data storage or data communications devices. A computer program 720 expressing the processes embodied on the removable data storage devices 710 may be loaded into the memory 730 and executed by processor 740, to configure magnetic read/write head controller 700 of FIG. 7, for execution. The computer program 720 comprises instructions which, when read and executed by magnetic read/write head controller 700 of FIG. 7, causes magnetic read/write head controller 700 to perform the steps necessary to execute the steps or elements of the present invention In summary, a method and apparatus have been presented which is effective to increase the storage capacity of magnetic media by reducing the amount of guard time required between sectors in the magnetic media. During a transition from read to write mode, a write standby signal is generated to place MR head write drivers into a warm-up mode, while the read mode is still active. The MR head write drivers, however, remain gated off until valid write data is present at the input to the MR head write drivers. Once detected, the valid write data present at the input to the MR head write drivers causes a full shut down in the read circuitry, allowing the commencement of a valid recording session. Allowing read mode to persist until the valid write data is detected, results in the reduction in the required guard time required per sector, which allows an increase in amount of memory storage available on the magnetic media.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A data storage device, comprising:

media for storing data signals thereon;

an actuator for positioning a write head relative to the media;

a controller coupled to provide a control signal and the data signals, wherein the write head comprises:

a data channel coupled to receive the control and data signals and coupled to start a timer upon receipt of the control signal, wherein the data channel is coupled to provide a write signal upon expiration of the timer; and a write amplifier coupled to detect the write signal and coupled to provide a flux inducing signal in response to the write signal upon detection of the write signal.

2. The data storage device of claim 1, wherein the control signal starts a warm-up period for the data channel and write amplifier.

3. The data storage device of claim 2, wherein the warm-up period expires when the write signal is provided.

4. The data storage device of claim 3, wherein the write amplifier comprises:

a detector coupled to receive the write signal and coupled to assert an enable signal upon detection of the write signal; and a final write stage coupled to receive the write signal and coupled to provide the flux inducing signal after assertion of the enable signal.

5. The data storage device of claim 4, wherein the final write stage comprises:

a first transistor pair coupled to receive the write signal and coupled to provide a first polarity of the flux inducing signal in response to a first level of the write signal;

a second transistor pair coupled to receive the write signal and coupled to provide a second polarity of the flux inducing signal in response to a second level of the write signal; and a switch circuit coupled to prevent the flux inducing signal prior to the assertion of the enable signal and coupled to allow the flux inducing signal after the assertion of the enable signal.

6. The data storage device of claim 5, wherein the first transistor pair comprises N-type Field Effect Transistors.

7. The data storage device of claim 5, wherein the second transistor pair comprises N-type Field Effect Transistors.

8. A write channel of a magnetic head controller comprising:
a data channel coupled to the write channel to receive write data and a control signal and coupled to start a timer upon receipt of the control signal, wherein the data channel transmits the write data upon expiration of the timer;
a detector coupled to the write channel to detect the write data and coupled to provide a write control signal after detecting the write data; and
an amplifier coupled to the write channel to receive the write control signal and the write data and coupled to convert the write data into a magnetic head signal in response to the write control signal.

9. The write channel of claim 8, wherein the detector comprises:
a logic circuit coupled to receive the write data and coupled to provide a detection signal upon detection of a transition of the write data; and
a memory storage device coupled to receive the detection signal and coupled to provide the write control signal.

10. The write channel of claim 9, wherein the amplifier comprises:
a first transistor pair coupled to receive the write data and coupled to provide a first polarity of the magnetic head signal in response to a first level of the write data;
a second transistor pair coupled to receive the write data and coupled to provide a second polarity of the magnetic head signal in response to a second level of the write data; and
a switch circuit coupled to prevent the flux inducing signal prior to the assertion of the write control signal and coupled to allow the magnetic head signal after the assertion of the write control signal.

11. The write channel of claim 10, wherein the first transistor pair comprises N-type Field Effect Transistors.

12. The write channel of claim 10, wherein the second transistor pair comprises N-type Field Effect Transistors.

13. A write channel of a magnetic head controller, comprising:
a data channel means coupled to the write channel to receive write data and a control signal and coupled to start a timer upon receipt of the control signal, wherein the data channel means transmits the write data upon expiration of the timer;
a detector means coupled to the write channel to detect the write data and coupled to provide a write control signal after detecting the write data; and
an amplifier means coupled to the write channel to receive the write control signal and the write data and coupled to convert the write data into a magnetic head signal in response to the write control signal.

14. The write channel of claim 13, wherein the detector comprises:
a logic circuit coupled to receive the write data and coupled to provide a detection signal upon detection of a transition of the write data; and a memory storage device coupled to receive the detection signal and coupled to provide the write control signal.

15. The write channel of claim 14, wherein the amplifier comprises:
a first transistor pair coupled to receive the write data and coupled to provide a first polarity of the magnetic head signal in response to a first level of the write data;
a second transistor pair coupled to receive the write data and coupled to provide a second polarity of the magnetic head signal in response to a second level of the write data; and
a switch circuit coupled to prevent the magnetic head signal prior to the assertion of the write control signal and coupled to allow the flux inducing signal after the assertion of the write control signal.

16. The write channel of claim 15, wherein the first transistor pair comprises N-type Field Effect Transistors.

17. The write channel of claim 16, wherein the second transistor pair comprises N-type Field Effect Transistors.

18. A method of operating a write channel of a magnetic head controller comprising:
establishing a write stabilization period while remaining in a read mode of operation;
transmitting write data when the stabilization period expires;
detecting the write data to cancel the read mode of operation; and
converting the write data to a magnetic head flux signal in response to detecting the transmitted write data.

19. The method of claim 18 wherein establishing the write stabilization period comprises setting a configurable terminal count within a timer.

20. The method of claim 18, wherein detecting the write data comprises detecting a transition in the write data.

21. The method of claim 18, wherein converting the write data comprises:
providing a first polarity of the magnetic head flux signal in response to a first level of the write data; and
providing a second polarity of the magnetic head flux signal in response to a second level of the write data.

22. An article of manufacture comprising a program storage medium readable by a computer, the medium tangibly embodying one or more programs of instructions executable by the computer to perform a method of operating a write channel of a magnetic head controller, the method comprising:
establishing a write stabilization period while remaining in a read mode of operation;
transmitting write data when the stabilization period expires;
detecting the write data to cancel the read mode of operation; and
converting the write data to a magnetic head flux signal in response to detecting the transmitted write data.

23. The method of claim 22 wherein establishing the write stabilization period comprises setting a configurable terminal count within a timer.

24. The method of claim 22, wherein detecting the write data comprises detecting a transition in the write data.

25. The method of claim 22, wherein converting the write data comprises:
providing a first polarity of the magnetic head flux signal in response to a first level of the write data; and
providing a second polarity of the magnetic head flux signal in response to a second level of the write data.

* * * * *